(12) United States Patent
Arazaki

(10) Patent No.: US 12,694,248 B2
(45) Date of Patent: Jul. 28, 2026

(54) PRINTING DEVICE AND DISPLAY PROGRAM

(71) Applicant: SEIKO EPSON CORPORATION, Tokyo (JP)

(72) Inventor: Shinichi Arazaki, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 281 days.

(21) Appl. No.: 18/441,041

(22) Filed: Feb. 14, 2024

(65) Prior Publication Data

US 2024/0281630 A1 Aug. 22, 2024

(30) Foreign Application Priority Data

Feb. 16, 2023 (JP) ................................. 2023-022622

(51) Int. Cl.
| | |
|---|---|
| *G06K 15/02* | (2006.01) |
| *B41J 3/407* | (2006.01) |
| *B41J 3/44* | (2006.01) |
| *B41J 15/04* | (2006.01) |
| *G06K 15/00* | (2006.01) |
| *G06K 15/16* | (2006.01) |

(52) U.S. Cl.
CPC .......... *G06K 15/024* (2013.01); *B41J 3/4075* (2013.01); *B41J 3/44* (2013.01); *B41J 15/04* (2013.01); *G06K 15/022* (2013.01); *G06K*

*15/16* (2013.01); *G06K 15/1885* (2013.01); *G06K 15/403* (2013.01); *G06K 2215/101* (2013.01)

(58) Field of Classification Search
None
See application file for complete search history.

(56) References Cited

U.S. PATENT DOCUMENTS

| | | | | |
|---|---|---|---|---|
| 2015/0172512 A1* | 6/2015 | Otake | .................... | H04N 1/644 |
| | | | | 358/1.9 |
| 2020/0050409 A1* | 2/2020 | Saito | ..................... | G06F 3/1296 |
| 2020/0104659 A1* | 4/2020 | Yamagata | .......... | G06K 15/1842 |

FOREIGN PATENT DOCUMENTS

JP        2016-146604 A        8/2016

* cited by examiner

*Primary Examiner* — Darryl V Dottin
(74) *Attorney, Agent, or Firm* — Spencer Fane LLP

(57) ABSTRACT

A printing device for performing printing by arranging a plurality of images in a predetermined printable range, wherein the printing device includes a calculation section for calculating the maximum number of the images that can be arranged in the printable range when the size of the image is changed according to each of a plurality of conversion scales for changing the size of the image and a list display section for displaying, as a list, the plurality of conversion scales and the maximum number corresponding to each of the plurality of conversion scales.

17 Claims, 9 Drawing Sheets

LO 15, 16

| | | | | | | | | | | | |
|---|---|---|---|---|---|---|---|---|---|---|---|
| REDUCTION RATIO (%) | 100 | 99 | 98 | 97 | 96 | 95 | ... | 86 | ... | 79 | ... | 77 |
| VERTICAL DIRECTION NUMBER | 3 | 3 | 3 | 4 | 4 | 4 | ... | 4 | ... | 4 | ... | 5 |
| HORIZONTAL DIRECTION NUMBER | 9 | 9 | 9 | 9 | 9 | 10 | | 11 | | 12 | | 12 |
| NUMBER OF PAGES | 27 | 27 | 27 | 36 | 36 | 40 | | 44 | | 48 | | 60 |

LO 15, 16

| | | | | | | |
|---|---|---|---|---|---|---|
| REDUCTION RATIO (%) | 100 | 97 | 95 | 86 | 79 | 77 |
| VERTICAL DIRECTION NUMBER | 3 | 4 | 4 | 4 | 4 | 5 |
| HORIZONTAL DIRECTION NUMBER | 9 | 9 | 10 | 11 | 12 | 12 |
| NUMBER OF PAGES | 27 | 36 | 40 | 44 | 48 | 60 |

LO 15, 16

| | | | |
|---|---|---|---|
| REDUCTION RATIO (%) | 100 | 97 | 77 |
| VERTICAL DIRECTION NUMBER | 3 | 4 | 5 |
| NUMBER OF PAGES | 27 | 36 | 60 |

L0　　15, 16
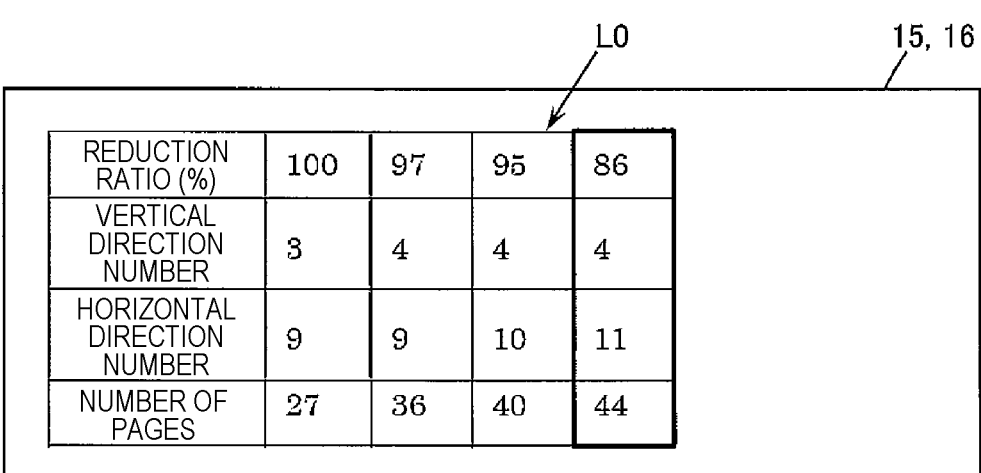
| REDUCTION RATIO (%) | 100 | 99 | 98 | 97 | 96 | 95 | ... | 86 | ... | 80 |
|---|---|---|---|---|---|---|---|---|---|---|
| VERTICAL DIRECTION NUMBER | 3 | 3 | 3 | 4 | 4 | 4 | ... | 4 | ... | 4 |
| HORIZONTAL DIRECTION NUMBER | 9 | 9 | 9 | 9 | 9 | 10 | | 11 | | 11 |
| NUMBER OF PAGES | 27 | 27 | 27 | 36 | 36 | 40 | | 44 | | 44 |
FIG. 9A
L0　　15, 16
| REDUCTION RATIO (%) | 100 | 97 | 95 | 86 |
|---|---|---|---|---|
| VERTICAL DIRECTION NUMBER | 3 | 4 | 4 | 4 |
| HORIZONTAL DIRECTION NUMBER | 9 | 9 | 10 | 11 |
| NUMBER OF PAGES | 27 | 36 | 40 | 44 |
FIG. 9B
L0　　15, 16
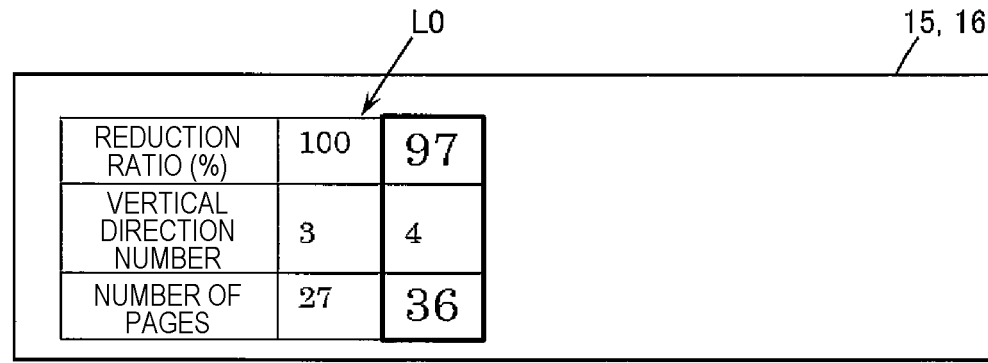
| REDUCTION RATIO (%) | 100 | 97 |
|---|---|---|
| VERTICAL DIRECTION NUMBER | 3 | 4 |
| NUMBER OF PAGES | 27 | 36 |
FIG. 9C

PRINTING DEVICE AND DISPLAY PROGRAM

The present application is based on, and claims priority from JP Application Serial Number 2023-022622, filed Feb. 16, 2023, the disclosure of which is hereby incorporated by reference herein in its entirety.

BACKGROUND

1. Technical Field

The present disclosure relates to a printing device for performing printing by arranging a plurality of images in a predetermined printable range and to a display program.

2. Related Art

As a printing device, for example, a printer is known that prints, on a label sheet of an adhesive sheet attached to a mount, a plurality of an image in the same size, in units of a predetermined printable range.

The printing device disclosed in JP-A-2016-146604 detects, from image data to be printed on an elongated label paper, a label image and an eye mark image provided corresponding to the label image, and determines the arrangement direction of the image of the image data so that the eye mark image and the label image do not overlap in the transport direction of the label paper. The printing device arranges the image of the image data repeatedly in the transport direction in the determined arrangement direction, and prints the image of the image data.

The printing device disclosed in JP-A-2016-146604 cannot change the size of the image to be printed.

When a print image is used in a commercial product, it may not be desirable to significantly change the size of the image. When the printing device prints a plurality of the image arranged in units of the predetermined printable range, depending on the size of the image, a great amount of margin may be generated due to a slight lack of area in the printable range when the image is imposed. If the margin is not used and is discarded, the amount of waste is increased. However, it is not easy to adjust the size of the image.

SUMMARY

The printing device of the present disclosure has an aspect of a printing device for performing printing by arranging a plurality of images in a predetermined printable range, the printing device including a calculation section configured to calculate a maximum number of the image arrangeable in the printable range when the size of the image is changed in accordance with each of a plurality of conversion scales for changing the size of the image and a list display section configured to display, as a list, the plurality of conversion scales and the maximum number corresponding to each of the plurality of conversion scales.

A display program of the present disclosure has an aspect of a display program for a printing device that performs printing by arranging a plurality of an image in a predetermined printable range, the display program causing a computer to realize a calculation function of calculating a maximum number of the image arrangeable in the printable range when the size of the image is changed in accordance with each of a plurality of conversion scales for changing the size of the image and a list display function of displaying, as a list, the plurality of conversion scales and the maximum number corresponding to each of the plurality of conversion scales.

BRIEF DESCRIPTION OF THE DRAWINGS

FIGS. 9A to 9C are diagrams schematically showing a display example in which the conversion scales in which the maximum number became the largest and that are closest to a conversion scale of one is recommended.

DESCRIPTION OF EMBODIMENTS

Figure 1:
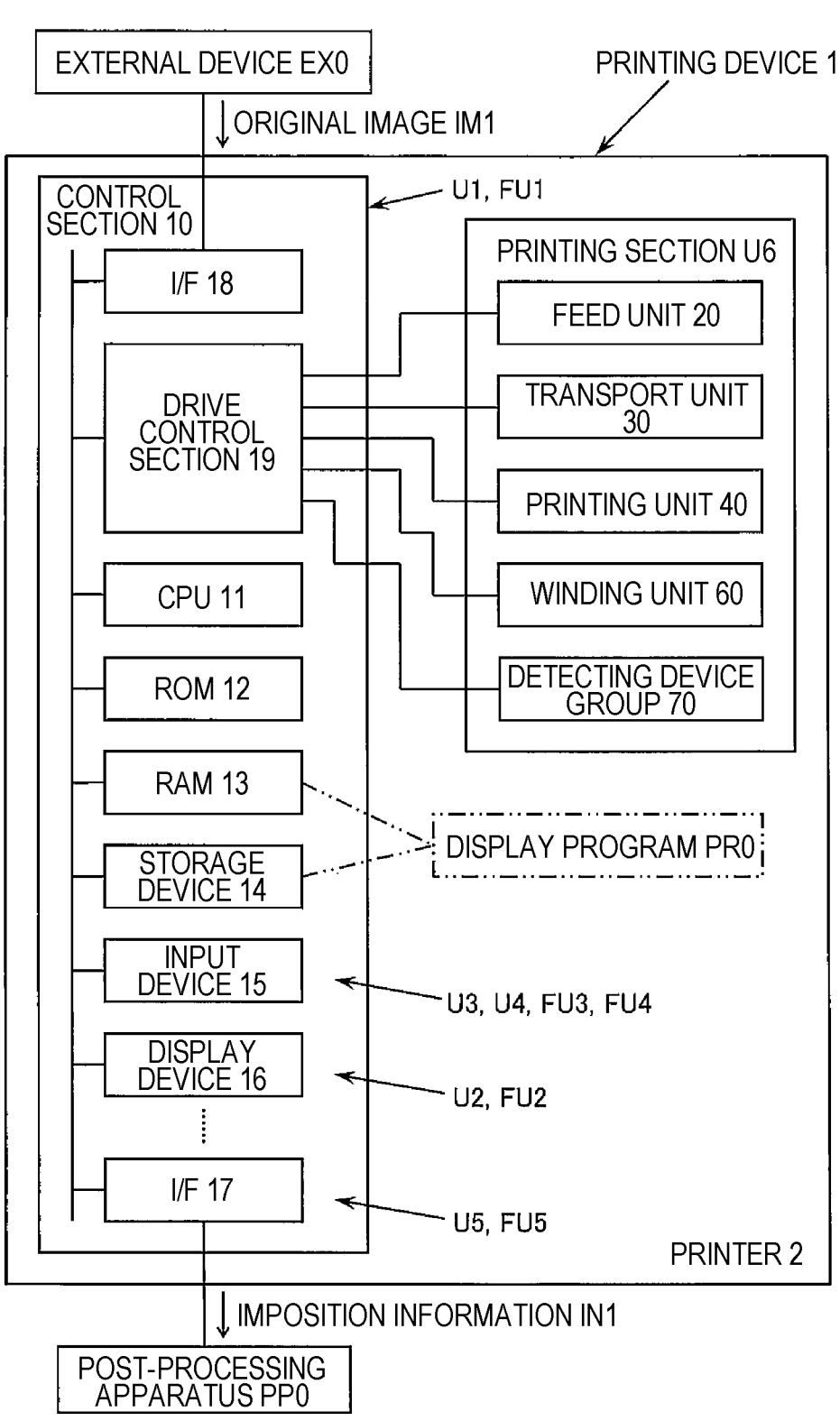
FIG. 1 is a block diagram schematically showing an example of a printing device.

Embodiments of the present disclosure will be described below. Of course, the following embodiments are merely illustrative of the present disclosure, and not all of the features shown in the embodiments are essential to the disclosed solution.

(1) OVERVIEW OF TECHNOLOGY INCLUDED IN THE PRESENT DISCLOSURE

First, an overview of the technology included in the present disclosure will be described with reference to the examples shown in FIGS. 1 to 9. Note that the drawings of the present application are diagrams that schematically illustrate examples, and the magnification ratios in the directions illustrated in these drawings may differ, and the respective drawings may not match. As a matter of course, each element of the present technology is not limited to specific examples indicated by reference numerals. In the "Overview of the technology included in the present disclosure", terms in parentheses mean a supplementary explanation of the immediately preceding term.

First Aspect

As illustrated in FIGS. 1, 2, 4A to 4C, 6, and the like, a printing device 1 according to an embodiment of the present invention is a printing device 1 that arranges a plurality of images IM0 in a predetermined printable range AR0 and prints the images IM0, and that is provided with a calculation section U1 and a list display section U2. The calculation section U1 calculates the maximum number Ns of images IM0 that can be arranged in the printable range AR0 when the size of the image IM0 is changed according to each of a plurality of conversion scales (for example, a reduction ratio S) for changing the size of the image IM0. The list display section U2 displays, as a list L0, the plurality of conversion scales (S) and the maximum number Ns corresponding to each of the plurality of conversion scales (S).

As described above, by viewing the displayed list L0, the user can grasp the maximum number Ns of images IM0 that can be arranged in the printable range AR0 for each of the plurality of conversion scales (S). Therefore, according to the above aspect, it is possible to provide a printing device capable of making it easy to select the number of images in the printable range by effectively utilizing the margin by changing the size of the image.

Here, the printable range in the present specification means a range that can be recognized as one page when the printing device performs printing, and may be the following ranges.

(Example 1) In the situation where the printing device performs printing by moving a print head while transport of a continuous medium, such as continuous paper (for example, a roll of paper), is stopped, the range in which the printing device executes printing without moving the medium.

(Example 2) The range of a single sheet of paper.

In the present specification, the "maximum number of the image arrangeable in the printable range" may be the maximum number of images that are arranged in the remaining space of the printable range when additional information other than the aforementioned images is arranged in the printable range.

The conversion scales may be reduction ratios, which means ratios at which an image is reduced, or may include magnification ratios, which means ratios at which an image is magnified.

The plurality of images may or may not be the same image. The same image could be a simple label, such as a specimen label to be adhered to a wine bottle. The plurality of images may be images to which different identification information is attached to the same base image, for example, images to which a production number and a best-used-before date are attached to a base image for a wine bottle. In this example, the production number and the best-used-before date can be different in the same job. The identification information includes a production number, a best-used-before date, a bar code, a two dimensional code, and the like.

Note that the above-described additional remarks are also applied to the following aspects.

Second Aspect

Figure 4A:
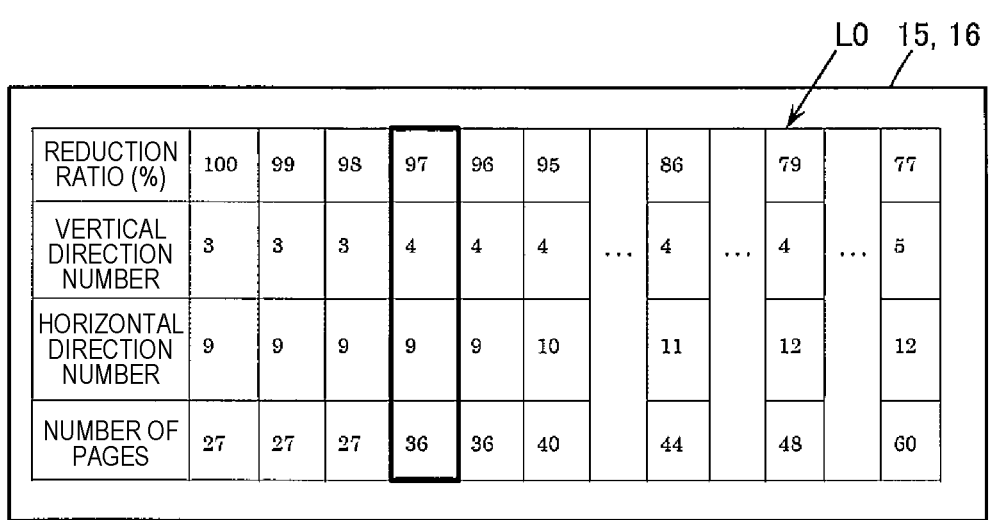
FIG. 4A to FIG. 4C are diagrams schematically showing examples of a list display.
Figure 4B:
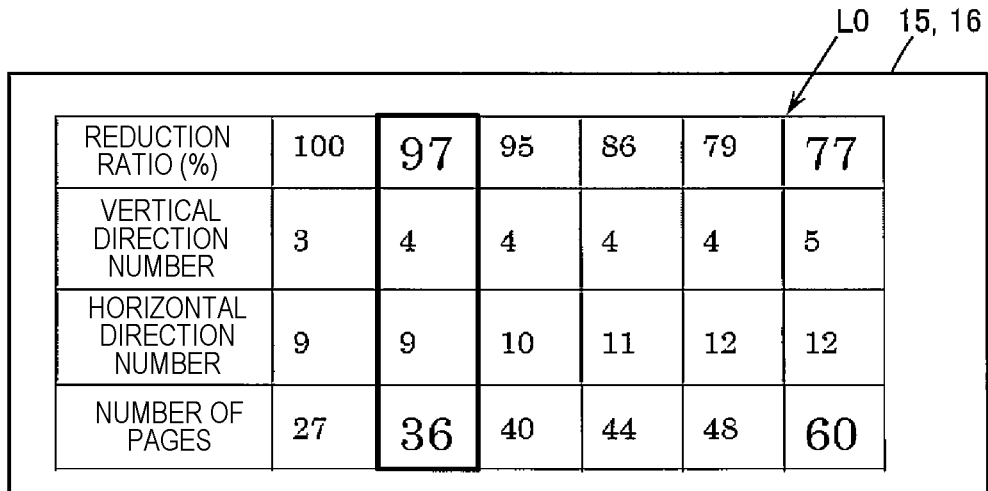

As illustrated in FIG. 4B and the like, when there are two or more conversion scales having the same maximum number Ns among the plural levels of conversion scales that include the plurality of conversion scales (S), the list display section U2 may display, in the list L0, one conversion scale selected from the two or more conversion scales. In the examples shown in FIGS. 4A and 4B, "plural levels of conversion scales" means a reduction ratio S in increments of 1% from 100% to 77%, and "a plurality of conversion scales" means a reduction ratio of 100%, a reduction ratio of 97%, a reduction ratio of 95%, a reduction ratio of 86%, a reduction ratio of 79%, and a reduction ratio of 77%. For example, the reduction ratios at which the maximum number Ns indicated by the "number of pages" is 27 are 100%, 99%, and 98%, so there are two or more conversion scales at which the maximum number Ns becomes the same number 27. In this case, "two or more conversion scales" means the reduction ratio of 100%, the reduction ratio of 99%, and the reduction ratio of 988, and the reduction ratio of 100% may be selected as illustrated in FIG. 4B, the reduction ratio of 99% may be selected, or the reduction ratio of 98% may be selected. Since the reduction ratios at which Ns=36 are 97% and 96%, there are two or more conversion scales at which the maximum number Ns are the same number 36. In this case, "two or more conversion scales" means a reduction ratio of 97% and a reduction ratio of 96%, and the reduction ratio of 97% may be selected as shown in FIG. 4B, or the reduction ratio of 96% may be selected.

As illustrated in FIG. 4B, the above-described aspect can reduce the display area of the list.

Third Aspect

As illustrated in FIG. 4B or the like, when among the plural levels of conversion scales there are two or more conversion scales at which the maximum number Ns is the same, then of the two or more conversion scales the list display section U2 may display, in the list L0, the conversion scale that is closest to one. In the examples shown in FIGS. 4A and 4B, since the reduction ratios at which Ns=27 are 100%, 99%, and 98%, the reduction ratio 100%, which is the one closest to a reduction ratio of one=100%, is selected from these reduction ratios. Since the reduction ratios of Ns=36 are 97% and 96%, the reduction ratio of 97%, which is the closest to a reduction ratio of one=100%, is selected from these reduction ratios.

According to the above aspect, the margin of the medium can be reduced as much as possible at the time of image reduction.

Note that although not included in the third aspect, a case where the list display section U2 displays, in the list L0, a conversion scale among the two or more conversion scales that is not the conversion scale closest to one is also included in the present technology.

Fourth Aspect

Figure 7:
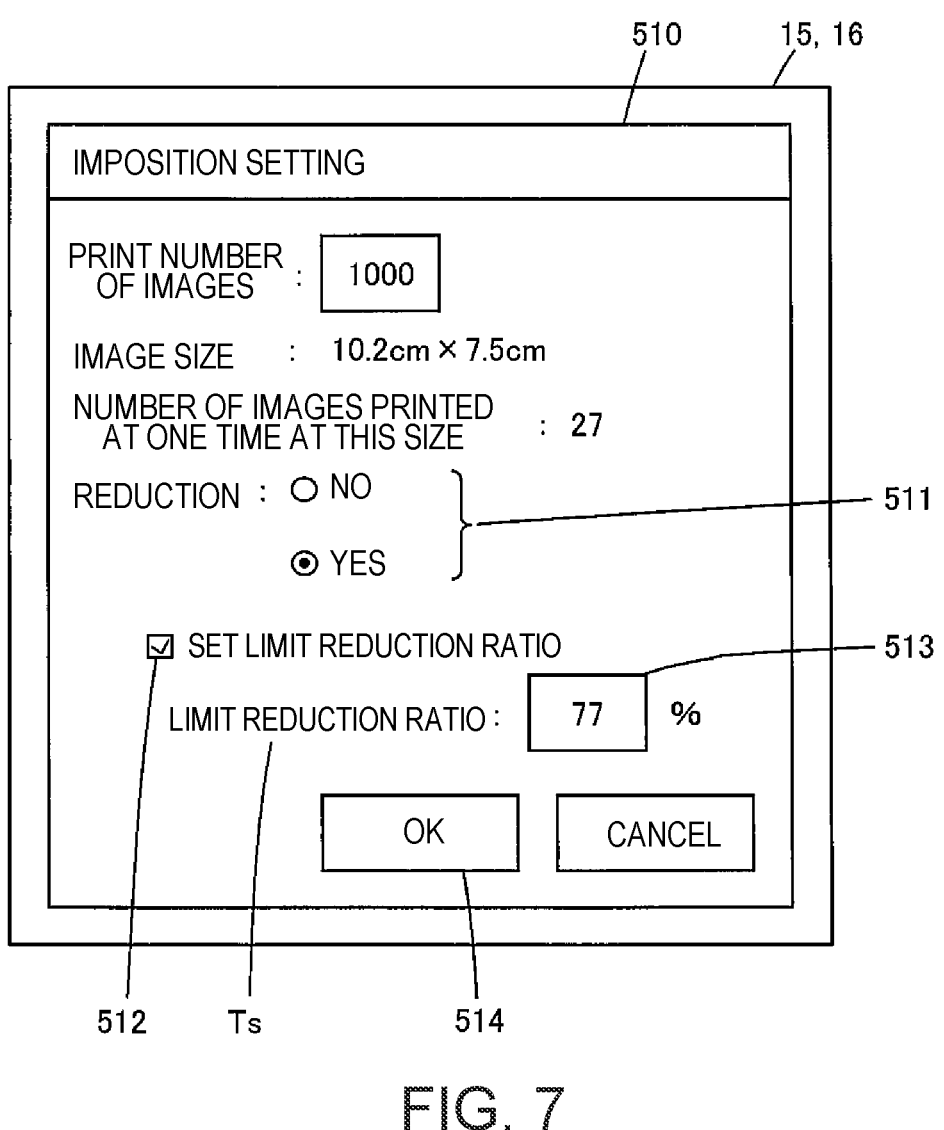
FIG. 7 is a diagram schematically showing a display example of an imposition setting screen.

As illustrated in FIGS. 1, 7, and the like, the printing device 1 may further include a setting reception section U3 that receives setting of a threshold value (for example, a limit reduction ratio Ts) indicating a lower limit of the plurality of conversion scales (S) for changing the size of the image. As illustrated in FIGS. 9A to 9C, the list display section U2 may perform display that recommends a conversion scale that, from among the plurality of conversion scales (S) equal to or larger than the threshold value (Ts), has the largest maximum number Ns and is closest to a conversion scale of one.

In this case, the user can grasp the conversion scale that, from among the plurality of conversion scales (S) that are equal to or larger than the threshold value (Ts), has the largest maximum number Ns and is closest to a conversion scale of one. Therefore, according to the above aspect, the margin can be effectively used by changing the size of the image and the number of images in the printable range can be even more easily selected.

Fifth Aspect

Figure 2:
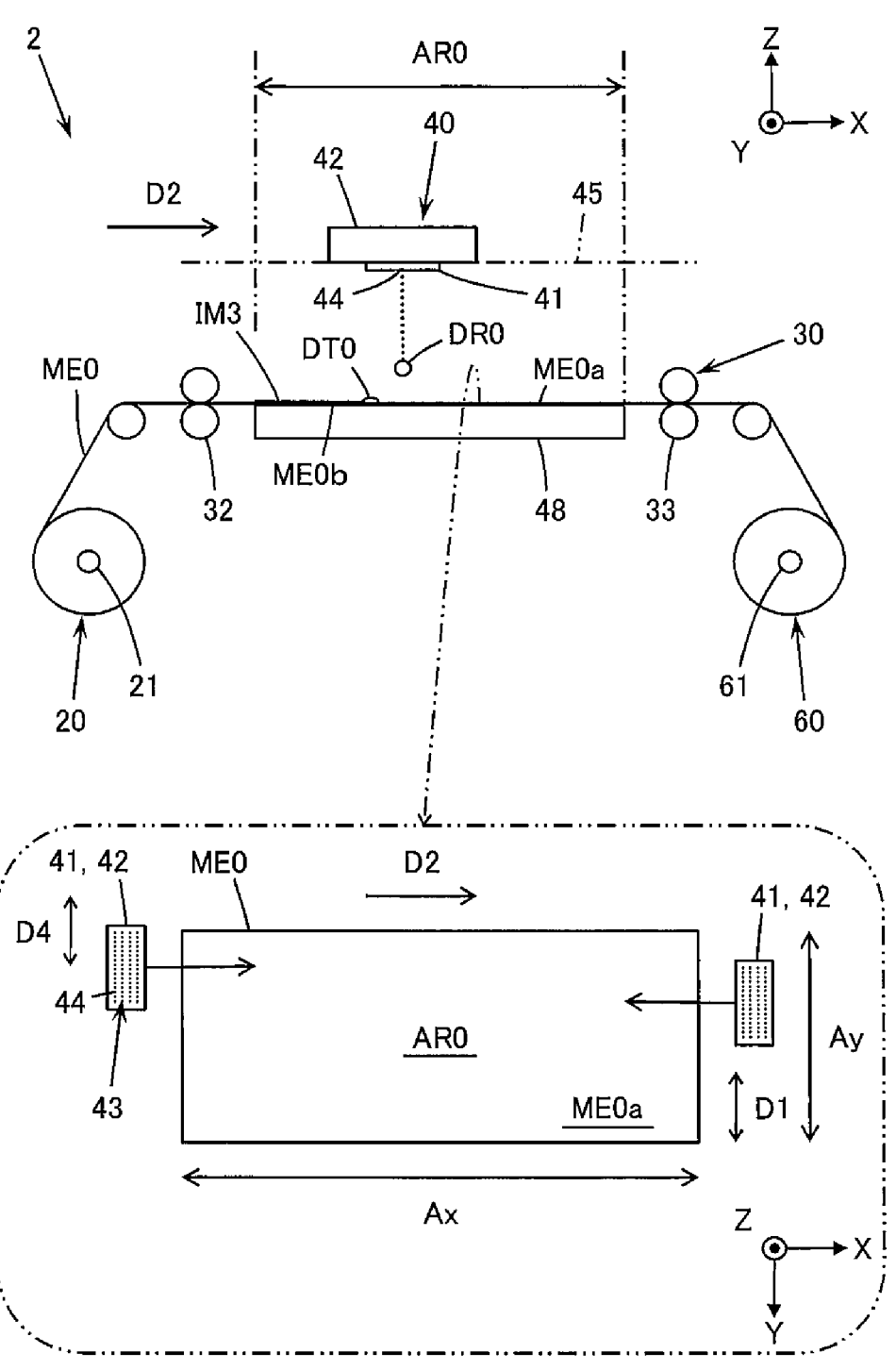
FIG. 2 is a diagram schematically showing an example of a mechanism of the printing device.
Figure 4C:
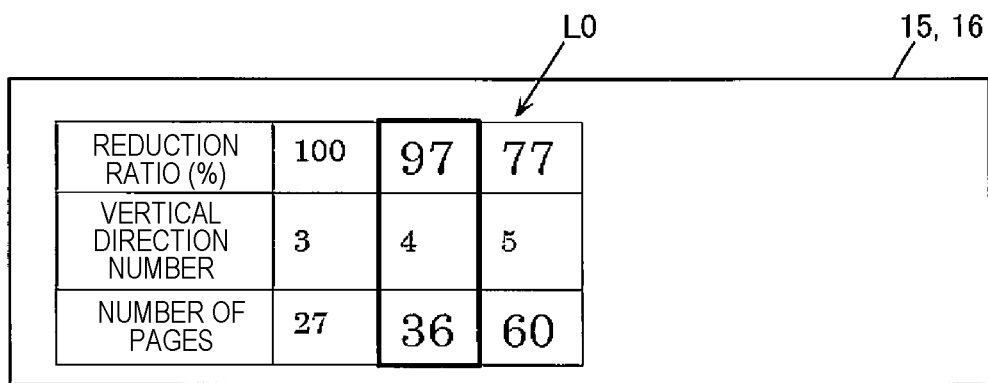

As illustrated in FIGS. 1 and 2, the printing device 1 may further include a roller for transporting a medium ME0 in a transport direction D2, which intersects a width direction D1, wherein the medium ME0 is longer in the transport direction D2 than in the width direction D1. The printable range AR0 may be included on the surface (for example, a print surface ME0a) of the medium ME0, and may be longer in the transport direction D2 than in the width direction D1. The calculation section U1 may calculate a width direction maximum number Yn, which is the maximum number of images IM0 that can be arranged in the printable range AR0 in the width direction D1 when the size of the image IM0 is changed in accordance with each of the plurality of conversion scales (S). As illustrated in FIGS. 4A to 4C, the list display section U2 may display the width direction maximum number Yn corresponding to each of the plurality of conversion scales (S) in the list L0.

The number of images IM0 that can be arranged in the entire printable range AR0 increases more when the number of images IM0 that can be arranged in the width direction D1 is increased by one, than when the number of images IM0 that can be arranged in the transport direction D2 is increased by one. Therefore, according to the above aspect, it is possible to effectively utilizing the margin by changing the size of the image and make it easier to select whether or not to increase the number of images in the printable range.

Sixth Aspect

Figure 6:
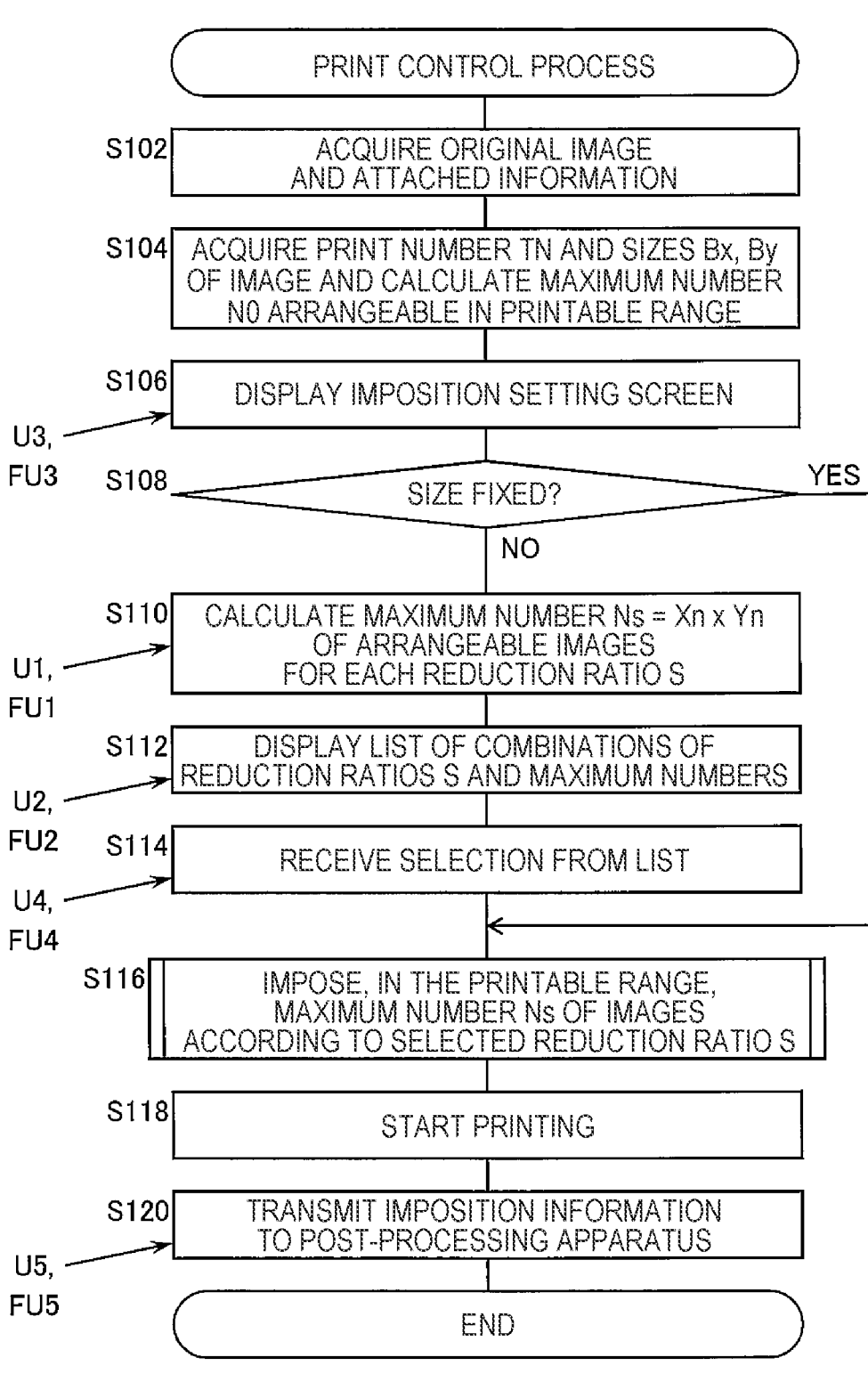
FIG. 6 is a flowchart schematically showing an example of a print control process including display of a list.

As illustrated in FIG. 6, when the size of the image IM0 is changed in accordance with each of the plurality of conversion scales (S), the calculation section U1 may calculate a first direction maximum number (for example, the width direction maximum number Yn), which is the maximum number of the image IM0 that can be arranged in the printable range AR0 in a first direction (for example, the width direction D1) along the printable range AR0, and a second direction maximum number (for example, the transport direction maximum number Xn), which is the maximum number of the image IM0 that can be arranged in the printable range AR0 in a second direction (for example, the transport direction D2) that intersects the first direction (D1) along the printable range AR0. As illustrated in FIGS. 4A and 4B, the list display section U2 may display the first direction maximum number (Yn) and the second direction maximum number (Xn) corresponding to the plurality of conversion scales (S) as the list L0.

In the above case, the user can grasp the state of the margin of the medium ME0 on which the image IM0 is printed in two directions. Therefore, the above aspect can improve the convenience of the printing device.

Here, "first", "second", and " . . . " in the present application are terms for identifying components included in a plurality of components having similarities, and do not mean the order. Which component of a plurality of components is "first", "second", or " . . . " is determined relatively.

Note that the above-described additional remarks are also applied to the following aspects.

Seventh Aspect

The printing device 1 may further include an operation reception section U4 that receives an operation of selecting one from at least one of either the plurality of conversion scales (S) included in the list L0 or the maximum number Ns corresponding to each of the plurality of conversion scales (S). The printing device 1 may further comprise a print head for printing, in the printable range AR0 and in the maximum number Ns corresponding to the operation, the image IM0 in a size changed according to a conversion scale that, among the plurality of conversion scales (S), corresponds to the operation.

In the above case, the user can set the conversion scales (S) at the time of printing by an intuitive operation. According to the above-described aspect, because it is possible to reduce the number of manual processes such as inputting a number by referring to the list L0, it is possible to reduce the possibility that an unintended error occurs.

Eighth Aspect

Figure 3:
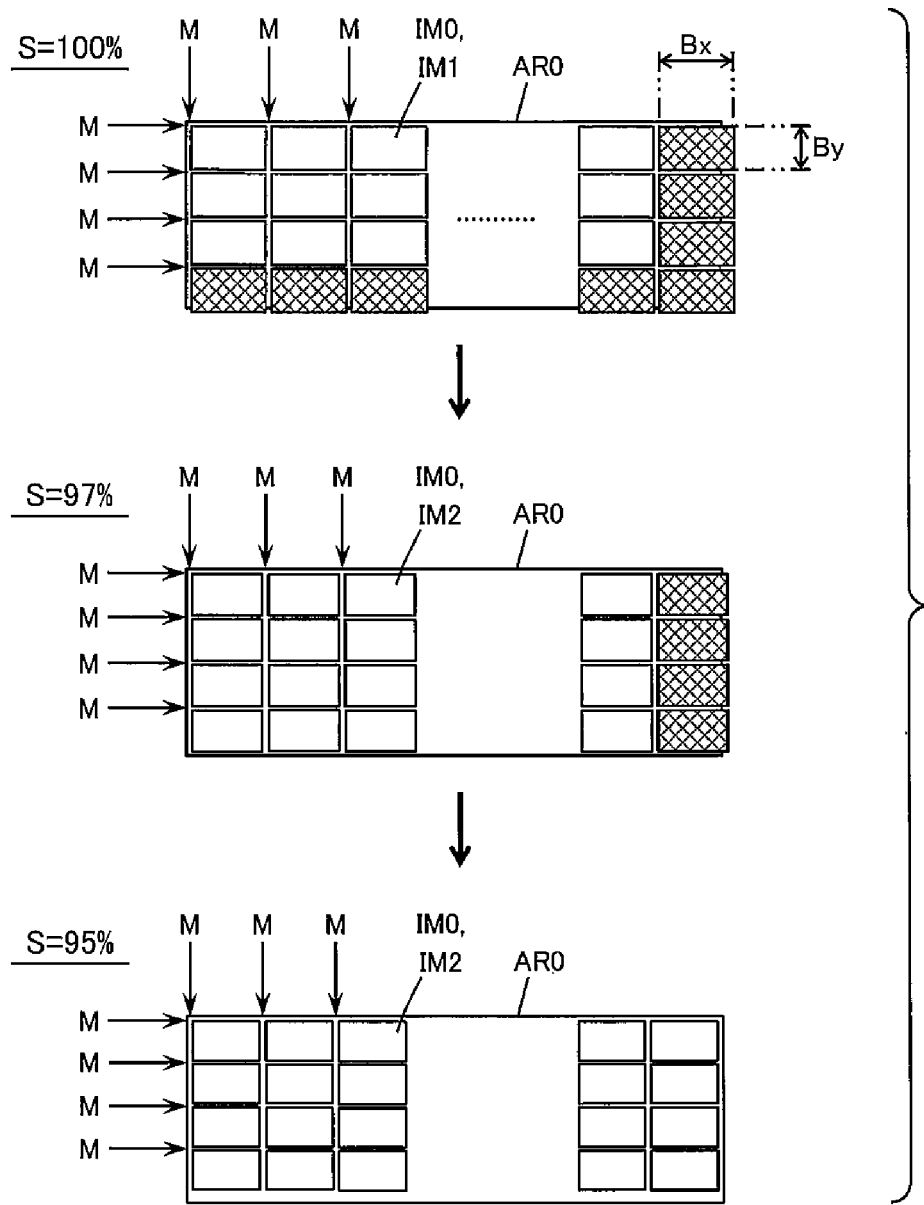
FIG. 3 is a diagram schematically showing an example of arrangement of an image allotted to a printable range.

As illustrated in FIG. 3, the images IM0 arranged at the maximum number Ns in the printable range AR0 may have the same size.

In this case, the printing device 1 can easily calculate the maximum number Ns of the images IM0. Therefore, according to the above aspect, it is possible to provide a suitable printing device having a list display section.

Ninth Aspect

As illustrated in FIGS. 1 and 3, the printing device 1 may further include a print head for printing the image IM0 at the maximum number Ns in the printable range AR0, with a gap M between the images IM0. The calculation section U1 may calculate the maximum number Ns of the image IM0 that can be arranged in the printable range AR0 including the gap M, when the size of the image IM0 is changed according to each of the conversion scales (S). The gap M may be constant even if the size of the image IM0 is changed.

The above aspect can provide an example suitable for a case where post-processing such as cutting between labels or peeling a label from a mount is performed.

Note that although not included in the ninth aspect, a case where there is no gap between images is also included in the present technology.

Tenth Aspect

As illustrated in FIG. 1, the printing device 1 may be connected to a post-processing apparatus PP0 that performs post-processing on printed matter that has the images IM0 arranged in the printable range AR0. The printing device 1 may further include a transmission section U5 for transmitting, to the post-processing apparatus PP0, information imposition IN1 indicating the arrangement of each image IM0 in the printable range AR0.

The above aspects can provide a suitable example of a printing device that operates together with a post-processing apparatus.

Eleventh Aspect

As illustrated in FIGS. 1 and 6, a display program PR0 according to an embodiment of the present invention is a display program PR0 for the printing device 1 that performs printing by arranging a plurality of the image IM0 in a predetermined printable range AR0 and that realizes a calculation function FU1 and a list display function FU2 in a computer. The calculation function (FU1) calculates the maximum number (Ns) of the image (IM0) which can be arranged in the printable range (AR0) when the size of the image (IM0) is changed according to each of a plurality of conversion scales (S) for changing the size of the image (IM0). The list display function FU2 displays the plurality of conversion scales (S) and the maximum number Ns corresponding to each of the plurality of conversion scales (S) as a list L0 on a display section (for example, the display device 16).

According to the above aspect, it is possible to provide a display program capable of making it easy to select the number of images in a printable range by effectively using a margin by changing the size of the image. Further, the display program PR0 may cause a computer to realize a setting reception function FU3 corresponding to the setting reception section U3, an operation reception function FU4 corresponding to the operation reception section U4, and a transmission function FU5 corresponding to the transmission section U5.

Further, the present technology is applicable to a printing system including the above-described printing device, a control method for the above-described printing device, a method for controlling the above-described printing system, a control program for the above-described printing system, a computer-readable recording medium on which any of the above-described control programs is recorded, and the like. The above-described printing device may be composed of a plurality of distributed parts.

(2) EMBODIMENT OF PRINTING DEVICE INCLUDING PRINTING DEVICE

FIG. 1 schematically illustrates the printing device 1. Although the printing device 1 in this specific example is the printer 2 itself, the printing device 1 may be a combination of the printer 2 and an external device EX0. The printer 2 may include additional elements not shown in FIG. 1. FIG. 2 schematically illustrates configuration of the printer 2. A plan view of the printable range AR0 viewed from above is shown in the lower part of FIG. 2 for explaining the movement of the print head 41 during printing. For convenience, an XYZ coordinate system is used assuming that the printer 2 is installed on a horizontal surface. In the example shown in FIG. 2, the direction along the transport direction D2 of the medium ME0 is the X direction, the direction along the width direction D1 of the medium ME0 is the Y direction, and the direction along the vertical direction is the Z direction. The X direction is assumed to be orthogonal to both the Y direction and the Z direction, but the X direction may not be orthogonal to the Y direction as long as it intersects the Y direction, and may not be orthogonal to the Z direction as long as it intersects the Z direction. The Y direction is assumed to be orthogonal to the Z direction, but the Y direction may not be orthogonal to the Z direction as long as it intersects the Z direction. Note that the direction (D2) in which the medium ME0 is transported is defined as the +X direction, the direction opposite to the transport direction D2 is defined as the −X direction, the direction toward the viewer with respect to the upper part of FIG. 2 is defined as the +Y direction, the direction away from the viewer with respect to the upper part of FIG. 2 is defined as the −Y direction, the upward direction is defined as the +Z direction, and the downward direction is defined as the −Z direction. FIG. 3 schematically illustrates the arrangement of images IM0 allocated to the printable range AR0. Among the plurality of images IM0 shown in FIG. 3, the shaded images means that the image does not fall within the printable range AR0.

Figure 5:
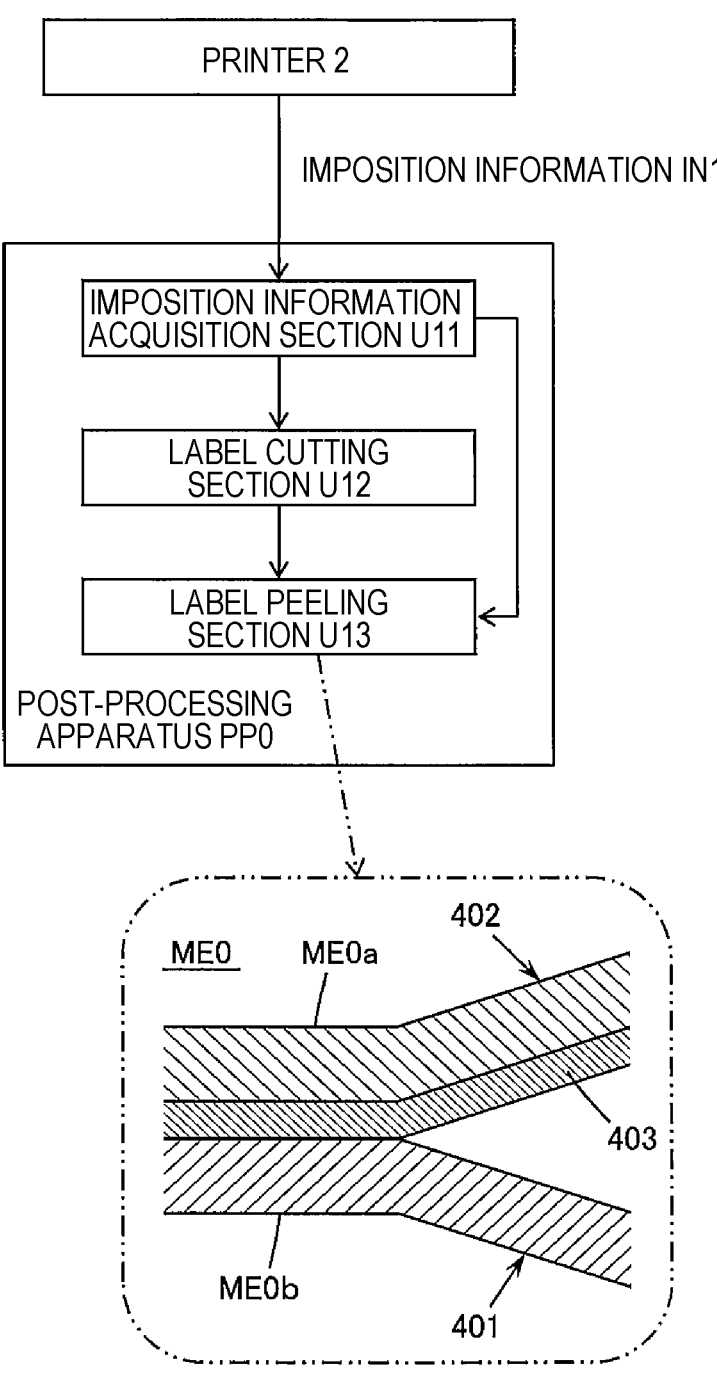
FIG. 5 is a block diagram schematically showing an example of a post-processing apparatus.

As shown in FIG. 2, the printer 2 may be an ink jet printer that ejects droplets DR0, for example, ink droplets, and may form the print image IM3 in the printable range AR0 by performing main scanning and sub-scanning. As shown in FIG. 2, the medium ME0 may be a continuous medium such as continuous paper, for example, a roll of paper. The medium ME0 is a material for sustaining a print image, and in this specific example, it is assumed to be a label sheet as illustrated in FIG. 5 in which an adhesive sheet 402 is attached to a mount 401. The adhesive sheet 402 has adhesive 403 on the back surface thereof. Of course, the material of the medium ME0 may be various materials such as paper, resin, metal, and the like, and the medium ME0 may a single-layer sheet, and the like, and not a label sheet.

The printer 2 shown in FIG. 1 includes a control section 10 and a printing section U6. The control section 10 includes a CPU 11 as a processor, a ROM 12 as a semiconductor memory, a RAM 13 as a semiconductor memory, a storage device 14, an input device 15, a display device 16, an I/F 17, an I/F 18, and a drive control section 19. These elements (11 to 19) are connected to a bus and can input and output information to and from each other. The printing section U6 includes a feed unit 20, a transport unit 30, a printing unit 40, a winding unit 60, and a detecting device group 70 Here, CPU is an abbreviation of Central Processing Section, ROM is an abbreviation of Read Only Memory, RAM is an abbreviation of Random Access Memory, and I/F is an abbreviation of interface. The control section 10 is an example of the calculation section U1, which corresponds to the calculation function FU1. The display device 16 is an example of a display section. The control section 10 including the display device 16 is an example of the list display section U2, which corresponds to the list display function FU2. The control section 10 including the input device 15 is an example of the setting reception section U3, which corresponds to the setting reception function FU3, and of the operation reception section U4, which corresponds to the operation reception function FU4. The control section 10 including the I/F 17, which is connected to the post-processing apparatus PPO, is an example of the transmission section U5, which corresponds to the transmission function FU5.

Note that the display device 16 may be provided outside the printer 2 or in the external device EX0. These aspects are also included in the printing device 1.

The control section 10 may be constituted by a System on a Chip, abbreviated as SoC. The CPU 11 is a device that mainly performs information processes and control in the printer 2, and performs various processes by executing programs read from the ROM 12 and the storage device 14 into the RAM 13. The storage device 14 stores a display program PRO for causing a computer to realize the above-described functions (FU1 to FU5), a rendering program for converting a vector image into a bitmap image, and the like. Here, vector image means an image expressed as a set of numerical information representing a graphic, and bitmap image means an image having color information for each pixel. The CPU 11 executes the display program PRO read into the RAM 13 to perform processes corresponding to the above-described functions (FU1 to FU5). The storage device 14 may be a nonvolatile semiconductor memory such as a flash memory, or may be a magnetic storage device such as a hard disk. A touch panel attached to the surface of the display device 16, a pointing device, a hard key including a keyboard, and the like, can be used as the input device 15. Based on display information, the display device 16 displays a screen corresponding to the display information. A liquid crystal display panel or the like can be used as the display device 16. The I/F 17 is connected to a post-processing apparatus PPO (to be described later) and inputs and outputs information to and from the post-processing apparatus PPO, such as transmitting imposition information IN1, which indicates the arrangement of each image IM0 in the printable range AR0, to the post-processing apparatus PPO. The I/F 18 is connected to the external device EX0 and inputs and outputs information to and from the external device EX0, such as receiving the original image IM1 from the external device EX0. The external device EX0 includes a computer such as a personal computer, a mobile phone such as a smartphone, a digital camera, a removable nonvolatile memory such as a removable flash memory, and the like. Communication by the I/F 17 and the I/F 18 may be wired, wireless, or via a network communication such as the Internet or a Local Area Network, which is abbreviated as LAN. The drive control section 19 controls the units (20, 30, 40, 60) using the detection results of the detecting device group 70.

It should be noted that least a part of the control section 10 may be constituted by an Application Specific Integrated Circuit, which is abbreviated as ASIC. Of course, a plurality of CPUs may perform processing in cooperation, or a CPU and another electronic component (for example, an ASIC) may perform processing in cooperation.

The feed unit 20 shown in FIG. 2 is provided with a winding shaft 21 for rotatably supporting the rolled medium ME0 and, under the control of the control section 10, feeds the elongated medium ME0 to the transport unit 30. The transport unit 30 shown in FIG. 2 includes a transport roller pair 32 on the upstream side and a discharge roller pair 33 on the downstream side, and transports the medium ME0 in the transport direction D2 along a predetermined transport path. Under the control of the control section 10, the transport unit 30 rotates the drive transport roller of the transport roller pair 32 and the drive discharge roller of the discharge roller pair 33 to intermittently feed the medium ME0 in the transport direction D2 in the units of the printable range AR0. The printable range AR0 shown in FIG. 2 is a maximum range in which the print image IM3 can be formed by movement of the print head 41 and the ejection of droplets DR0 in a state where the transport of the medium ME0 is stopped. The control section 10 alternately repeats feed of the medium ME0 by the transport unit 30 and the printing by the printing unit 40. The printing unit 40 includes a print head 41, a carriage 42, and a platen 48 for supporting the back surface ME0b of the medium ME0 and, under the control of the control section 10, forms a print image IM3 on the print surface ME0a of the medium ME0 by a pattern of dots DT0 from droplets DR0. When the feeding of the medium ME0 is stopped, the platen 48 may maintain the medium ME0 in the printable range AR0 by sucking the back surface ME0b of the medium ME0 onto the upper surface of the platen 48 using a suction mechanism. The winding unit 60 is provided with a winding drive shaft 61 for winding up the printed medium ME0 and, under the control of the control section 10, winds up the printed medium ME0.

Note that the printing section U6 may be provided with a drying section for drying the printed medium ME0, between the printing unit 40 and the winding unit 60.

The print head 41 has on, a nozzle surface, a plurality of nozzle arrays 43 that include a plurality of nozzles 44 and that are arranged in an alignment direction D4 at intervals of a predetermined nozzle pitch, and performs printing by ejecting droplets DR0 to the medium ME0 on the platen 48. The plurality of nozzles 44 included in each nozzle array 43 may be arranged in one row, or may be arranged in a staggered manner, that is, in two rows. The print head 41 shown in FIG. 2 is mounted on a carriage 42 that reciprocates in the +X direction and the −Y direction along a guide 45 that is along the transport direction D2 and moves in the Y direction along a guide (not shown) along the width direction D1. The alignment direction D4 of the nozzles 44 may be any direction as long as it intersects the transport direction D2, and may be a direction along the width direction D1 or a direction deviated from the width direction D1. The print head 41 is provided with a driving element or the like for ejecting droplets DR0 from the nozzles 44. As the driving element, a piezoelectric element for applying pressure to liquid in a pressure chamber communicating with the nozzles 44, a driving element for generating bubbles in the pressure chamber by heat to eject the droplets DR0 from the nozzles 44, or the like can be used. The pattern of the dots DT0 of the droplets DR0 according to the image IM0 is formed on the print surface ME0a of the medium ME0, thereby forming the print image IM3 on the medium ME0.

The carriage 42 moves in the +X direction or the −Y direction during main scanning in which the print head 41 ejects the droplets DR0, and moves in the +Y direction during sub-scanning in which the print head 41 does not eject droplets DR0. The method of recording the print image IM3 on the printable range AR0 may be an interlace method or a band method. When bi-directional printing is performed, the control section 10 causes the print head 41 to eject droplets DR0 while the carriage 42 is moving in the +X direction and the −Y direction. The control section 10 performs control for forming the print image IM3 over the entire printable range AR0 by alternately repeating the main scanning and the sub-scanning. When unidirectional printing is performed, for example, the control section 10 causes the print head 41 to eject droplets DR0 when the carriage 42 is moving in the +X direction, and does not cause the print head 41 to eject the droplets DR0 when the carriage 42 is moving in the −x direction. When printing of the print image IM3 in the printable range AR0 is completed, the carriage 42 moves in the −Y direction and returns to the origin position.

Note that the moving direction of the carriage 42 during the main scanning is not limited to the X direction along the transport direction D2, but may be the Y direction along the width direction D1. In this case, the moving direction of the carriage 42 during sub-scanning is the X direction.

When the nozzle array 43 is provided over the entire printable range AR0 in the width direction D1, the print image IM3 can be formed over the entire printable range AR0 by moving the print head 41 once in the X direction.

As shown in FIG. 3, the printer 2 arranges a plurality of images IM0 in the printable range AR0 based on the original image IM1. A gap M may be provided between the images IM0 for post-processing, such as cutting between the labels or peeling of the labels from the mount. The upper part of FIG. 3 shows an example in which the image IM0 having the reduction ratio S of 100%, that is, the original image IM1, is arranged in the printable range AR0. Of course, all the original images IM1 arranged in the printable range AR0 have the same size. As shown in the upper part of FIG. 3, depending on the size of the original image IM1, the area of the printable range AR0 may be slightly insufficient for imposing the original image IM1, so that a large margin area may be generated. If the margin is not used and is discarded, the amount of waste is increased.

In a case where the printed material of the image IM0 is used for a commercial product, it may not be desirable to greatly change the size of the image IM0. Therefore, it is not easy for the user to adjust the size of the original image IM1 at the external device EX0.

In this embodiment, the printing device 1 causes the display device 16 to display a list L0 of reduction ratios S and the like as illustrated in FIGS. 4A to 4C, thereby facilitating the selection of the reduction ratio S. The reduction ratio S is an example of a conversion scale for changing the size of the image IM0. Details of the list L0 will be described later.

The width of the medium ME0, that is, the length in the width direction D1, which is an example of a first direction, has a specified size, such as 33 cm. Normally, printing is performed with margins provided at both width direction D1 ends of the medium ME0. As an example, the width of the printable range AR0 shown in FIG. 2, that is, the vertical size Ay, is set to 30 cm. Even if the medium ME0 is continuous in the transport direction D2 like a roll of paper, when print head 41 reciprocates in the X direction as shown in FIG. 2, the length Ax of the printable range AR0 in the horizontal direction, that is, in the transport direction D2, which is an example of the second direction, is specified. As an example, the horizontal size Ax of the printable range AR0 shown in FIG. 2 is 1 m.

Usually, for the purpose of shortening the printing time and efficiently using the media ME0, an imposition process for arranging a plurality of images IM0 in the size Ax×Ay of the printable range AR0 is performed, and the imposed images IM0 are printed. The number of images IM0 that can be arranged in the Ax×Ay printable range AR0 varies depending on the size of the target image IM0.

Depending on the size of the image IM0, a considerable margin may be generated as a result of imposition.

As an example, it is assumed that the horizontal size Bx of the original image IM1 shown in FIG. 3 is 10.2 cm, the vertical size By of the original image IM1 shown in FIG. 3 is 7.5 cm, and the gap M between original images IM1 is 0.25 cm. In this case, nine original images IM1 can be arranged in the horizontal direction, three original images IM1 can be arranged in the vertical direction, and 9×3=27 original images IM1 can be arranged in the printable range AR0. However, there is a 1 m−(10.2 cm×9+0.25 cm× 8)=6.4 cm margin in the horizontal direction, and a 30 cm−23 cm (7.5 cm×3+0.25 cm× 2)=7 cm margin in the vertical direction. In particular, a vertical direction margin of 7 cm is a size slightly insufficient with respect to the original image IM1 of 7.5 cm.

The middle part of FIG. 3 shows an example in which a converted image IM2 having a reduction ratio S of 97% is arranged in the printable range AR0. All the converted images IM2 arranged in the printable range AR0 have the same size. Note that the concept of the image IM0 includes an original image IM1 and a converted image IM2. When the reduction ratio S is set to 97%, four converted images IM2 are arranged in the vertical direction to have a size of 29.5 cm while maintaining a gap of 0.25 cm between the images IM0. Thus, the printing condition of the vertical size Ay can be effectively used. Since the size of the converted image IM2 is 97% of the original image IM1, the size change is slight. Therefore, unless the size is strictly specified, the converted image IM2 can be used for printing.

The lower part of FIG. 3 shows an example in which a converted image IM2 having a reduction ratio S of 95% is arranged in the printable range AR0. All the converted images IM2 arranged in the printable range AR0 have the same size. When the reduction ratio S is 95%, one more horizontal direction line's worth of the converted image IM2 can be arranged in the printable range AR0.

In the above example, 27 original images IM1 are imposed on the printable range AR0 and, with respect to the converted image IM2 in which the original image IM1 is reduced to 97%, 36 converted images IM2 are imposed in the printable range AR0. Forty (40) converted images IM2 are imposed in the printable range AR0 in the case of a converted image IM2 in which the original image IM1 is reduced to 95%. In particular, the increase from 27 to 36 has a large effect and can effectively reduce the margin.

Here, the transport direction maximum number, which is the maximum number of the image IM0 arranged in the horizontal direction, is Xn and the width direction maximum number, which is the maximum number of the image IM0 arranged in the vertical direction, is Yn. The width direction maximum number Yn is an example of the first direction maximum number, and the transport direction maximum number Xn is an example of the second direction maximum number.

For the horizontal direction, the following inequalities must be satisfied:

$$Ax \geqq Xn \times (S/100) \times Bx + (Xn - 1) \times M \qquad (1)$$

For the vertical direction, the following inequalities must be met:

$$Ay \geqq Yn \times (S/100) \times By + (Yn - 1) \times M \qquad (2)$$

The transport direction maximum number Xn and the width direction maximum number Yn can be calculated by the following equations, where the function of rounding down the decimal point is represented by INT.

$$Xn = INT[(Ax + M)/\{(S/100) \times Bx + M\}]. \qquad (3)$$

$$Yn = INT[(Ay + M)/\{(S/100) \times By + M\}]. \qquad (4)$$

The maximum number Ns of the images IM0 that can be arranged in the printable range AR0 can be calculated by the following equation.

$$Ns = Xn \times Yn \qquad (5)$$

FIG. 4A schematically illustrates the list L0 displayed on the display device 16. Note that in FIGS. 4A to 4C, "reduction ratio (%)" means the reduction ratio S, "vertical direction number" means the width direction maximum number Yn, "horizontal direction number" means the transport direction maximum number Xn, and the "number of pages" means the maximum number Ns.

The printer 2 calculates the maximum number Ns of images 1 that can be arranged in the printable range AR0 when the size of the image 1 is changed according to each of the plurality of reduction ratios S and displays, as the list L0, each reduction ratio S and the maximum number Ns corresponding to each reduction ratio S. The list L0 shown in FIG. 4A shows the maximum number Ns of the images IM0 from the reduction ratio 100% to the reduction ratio 77% in 1% increments. For convenience of illustration, for reduction ratios of less than 95%, reduction ratios S in which the maximum number Ns changes are picked up and described. Due to the relationship between the size of the printable range AR0 and the size of the image IM0, the maximum number Ns of the image IM0 greatly increases in the list L0 shown in FIG. 4A when the number arranged in the vertical direction increases by one. Also from the viewpoint of effectively utilizing the medium ME0, when the reduction ratio S decreases in the list L0 shown in FIG. 4A by increments of 1%, the medium ME0 can be effectively used at the reduction ratio immediately after the maximum number Ns increases. When the original image IM1 is reduced to 97%, additional converted images IM2 can be arranged in the vertical direction as compared with the case where the reduction ratio S is 100 to 98%, so that the maximum number Ns of the images IM0 which can be arranged in the printable range AR0 increases from 27 to 36. Thereafter, the maximum number Ns can be increased as the image IM0 is reduced. In the list L0 shown in FIG. 4A, the candidate of the reduction ratio S having the largest effect is 97%.

Note that the reduction ratio S is not limited to increments of 1%, but may be in increments of 0.5%, 2%, or the like. When among the reduction ratios of the plurality of levels illustrated in FIG. 4A, there are two or more reduction ratios at which the maximum number Ns is the same, then as illustrated in FIG. 4B, the printer 2 may display, in the list L0, one selected from the two or more reduction ratios. When among the reduction ratios in the plurality of levels, there are two or more reduction ratios at which the maximum number Ns is the same, then in the list L0 shown in FIG. 4B, the reduction ratio closest to a reduction ratio of one is displayed among the two or more reduction ratios.

As shown in FIGS. 4A and 4B, since the reduction ratios at which Ns=27 are 100%, 99%, and 98%, which are two or more, the printer 2 displays, in the list L0, the one reduction ratio selected from these reduction ratios, for example, the reduction ratio 100%, which is closest to a reduction ratio of one=100%. Since the reduction ratios that result in Ns=36 are 97% and 96%, the printer 2 displays, in the list L0, the one reduction ratio selected from these reduction ratios, for example, 97%, which is closest to a reduction ratio of one=100%.

When the above inequalities (1) and (2) are solved for the reduction ratio S, the following inequalities are obtained.

$$S \leq \left[ \{Ax - (Xn - 1) \times M\} \times 100/(Xn \times Bx) \right]. \qquad (6)$$

$$S \leq \left[ \{Ay - (Yn - 1) \times M\} \times 100/(Yn \times By) \right]. \qquad (7)$$

In the case where the reduction ratio S is in increments of 1%, the maximum reduction ratio S that results in the transport direction maximum number Xn with respect to the horizontal direction can be calculated by the following equation.

$$S = INT\left[ \{Ax - (Xn - 1) \times M\} \times 100/(Xn \times Bx) \right]. \qquad (8)$$

When the reduction ratio S is in increments of 18, the maximum reduction ratio S that results in the width direction maximum number Yn with respect to the vertical direction can be calculated by the following equation.

$$S = INT\left[ \{Ay - (Yn - 1) \times M\} \times 100/(Yn \times By) \right]. \qquad (9)$$

In the equations (8) and (9), the maximum value of the reduction ratio S is set to 100%.

Therefore, with respect to the horizontal direction, the printer 2 may select the reduction ratio S obtained from the above equation (8) while changing the transport direction maximum number Xn of the original images IM1 to an initial value, an initial value+1, an initial value+2, . . . . With respect to the vertical direction, the printer 2 may select the reduction ratio S obtained from the above equation (9) while changing the width direction maximum number Yn of the original images IM1 to an initial value, an initial value+1, an initial value+2, . . .

For example, it will be assumed that Ax=100 cm, Ay=30 cm, Bx=10.2 cm, By=7.5 cm, and M=0.25 cm. When the reduction ratio S is 100%, according to the above equations (3) and (4), Xn=9 and Yn=3. Therefore, with respect to the horizontal direction, the printer 2 selects the reduction ratios of 100%, 95%, 86%, and . . . obtained from the above equation (8) in the range of 100% or less while changing the transport direction maximum number Xn to 9, 10, 11, . . . , using the transport direction maximum number of 9 as the initial value. With respect to the vertical direction, the printer 2 selects the reduction ratios 100%, 97%, 77%, and . . . obtained from the above equation (9) within a range of 100% or less while changing the width direction maximum number Yn to 3, 4, 5, . . . , using the width direction maximum number of 3 as an initial value. Therefore, the printer 2 displays the combinations of the reduction ratio S and the maximum number Ns in the list L0 for the reduction ratios 100%, 97%, 95%, 86%, 77%, . . . obtained with respect to the horizontal direction and to the vertical direction.

As illustrated in FIGS. 4A and 4B, the printer 2 displays, in the list L0, the width direction maximum number Yn and the transport direction maximum number Xn corresponding to each of the plurality of reduction ratios S. Thus, the user can grasp in two directions the state of the margin of the medium ME0 on which the image IM0 is printed.

As in the list L0 shown in FIG. 4B, the printer 2 highlights a portion where the increase ratio of the maximum number Ns increases by a predetermined ratio or more, for example, by 0.2 or more, due to a decrease in the reduction ratio S. The increase ratio is expressed by a calculated value obtained by dividing a value immediately after the maximum number Ns increases, by a value immediately before the maximum number Ns increases. For example, when the maximum number Ns increases from 27 to 36 when the reduction ratio S decreases, 36/27=1.33, which means that the increase ratio increases by 0.33, which is larger than 0.2. Therefore, the combination of the reduction ratio 97% and the maximum number is highlighted. When the maximum number Ns increases from 48 to 60 as the reduction ratio S decreases, 60/48=1.25, which means that the increase ratio increases by 0.25, which is larger than 0.2. Therefore, the combination of the reduction ratio 77% and the maximum number is highlighted.

As illustrated in FIG. 4C, when among the reduction ratios in the plurality of levels illustrated in FIG. 4A, there are two or more reduction ratios at which the width direction maximum number Yn is the same, then the printer 2 may display, in the list L0, one selected from the two or more reduction ratios. In the list L0 shown in FIG. 4C, when among the reduction ratios in the plurality of levels, there are two or more reduction ratios that result in the same width direction maximum number Yn, then among the two or more reduction ratios, the reduction ratio closest to a reduction ratio of one is displayed.

As shown in FIGS. 4A and 4C, since the reduction ratios that result in Yn=3 are 100%, 99%, and 98%, which are two or more, the printer 2 displays, in the list L0, one reduction ratio selected from these reduction ratios, for example, the reduction ratio 100%, which is the closest to a reduction ratio of one=100%. Since the reduction ratios that result in Yn=4 are 97%, 96% . . . , and 79%, the printer 2 displays, in the list L0, one reduction ratio selected from these reduction ratios, for example, 97%, which is closest to a reduction ratio of one=100%.

The printing section U6 shown in FIG. 1 prints the maximum number Ns of the images IM0 in the printable range AR0 with a gap M between the images IM0. Since the gap M is constant even if the size of the image IM0 is changed, it is easy for the post-processing apparatus PP0 to perform post-processing such as cutting between labels and peeling the labels off the mount. The printing section U6 transports the medium ME0, which is longer in the transport direction D2 than in the width direction D1, in the transport direction D2. The printable range AR0 is included in the print surface ME0a of the medium ME0, and is longer in the transport direction D2 than in the width direction D1. The number of images IM0 that can be arranged in the entire printable range AR0 increases more when the number of images IM0 that can be arranged in the width direction D1 is increased by one, than when the number of images IM0 that can be arranged in the transport direction D2 is increased by one. Since the list L0 including the width direction maximum number Yn is displayed, the user can easily select whether or not to increase the number of images IM0 in the printable range AR0 and effectively using the margin by changing the size of the images IM0.

When a touch panel as the input device 15 is attached to the surface of the display device 16 shown in FIGS. 4A to 4C, the input device 15 may receive a contact operation for determining the reduction ratio S on the display of the list L0. In this case, on the display of the list L0, the input device 15 may receive an operation of selecting one of at least one of the plurality of reduction ratios S included in the list L0 or the maximum numbers Ns corresponding to the plurality of reduction ratios S. In this case, the printing section U6 prints the image IM0, whose size is changed according to the reduction ratio S that corresponds to the contact operation, in the printable range AR0 in the maximum number Ns that corresponds to the contact operation.

As illustrated in FIG. 5, the printer 2 transmits the imposition information IN1 indicating the arrangement of each image IM0 in the printable range AR0 from the I/F 17 shown in FIG. 1 to the post-processing apparatus PPO. The post-processing apparatus PPO shown in FIG. 5 includes an imposition information acquisition section U11, a label cutting section U12, and a label peeling section U13, and performs post-processing on the printed matter in which a plurality of images IM0 are arranged in the printable range AR0.

The imposition information acquisition section U11 receives the imposition information IN1 from the printer 2. Based on the imposition information IN1, the label cutting section U12 cuts the adhesive sheet 402 at the gap M between the images IM0 on the medium ME0 on which the print images IM3 are formed on the adhesive sheet 402. As shown in the lower part of FIG. 5, the adhesive sheet 402 has a print surface ME0a on the front surface thereof, has an adhesive 403 on the back surface thereof, and is attached to a mount 401. The label cutting section U12 may cut the adhesive sheet 402 by applying a blade to the adhesive sheet 402 in the gap M based on the imposition information IN1. The label cutting section U12 may cut the adhesive sheet 402 by irradiating the adhesive sheet 402 with a laser in the gap M based on the imposition information IN1. The label cutting section U12 may cut the adhesive sheet 402 by another method. The label peeling section U13 peels the cut adhesive sheets 402 from the mount 401 based on the imposition information IN1. The label peeling section U13 may peel each adhesive sheet 402 from the mount 401 based on the imposition information IN1 while bending the medium ME0. The label peeling section U13 may peel each adhesive sheet 402 from the mount 401 by another method.

Note that the post-processing apparatus that receives the imposition information IN1 from the printer 2 may not have the label peeling section U13, and processing up to cutting the adhesive sheet 402 based on the imposition information IN1 may be performed as post-processing. A post-processing apparatus without the label peeling section U13 may perform processing for separating the medium ME0 for each image IM0 based on the imposition information IN1 as post-processing.

(3) SPECIFIC EXAMPLE OF PRINT CONTROL PROCESS INCLUDING DISPLAY OF A LIST

FIG. 6 schematically illustrates a print control process including display of a list L0 such as shown in FIGS. 4A to 4C. The process shown in FIG. 6 is performed by the control section 10 shown in FIG. 1. Here, step S106 corresponds to the setting reception section U3 and the setting reception function FU3. Step 110 corresponds to the calculation section U1 and the calculation function FU1. Step S112 corresponds to the list display section U2 and the list display function FU2. Step S114 corresponds to the operation reception section U4 and the operation reception function FU4. Step S120 corresponds to the transmission section U5 and the transmission function FU5. Hereinafter, the word "step" may be omitted, and reference numerals of steps may be indicated in parentheses.

When the print control process is started, the control section 10 acquires the original image IM1 and the attached information from the external device EX0 (S102). The original image IM1 is preferably a vector image, but may be a bitmap image. The file format of the original image IM1 may be Portable Document Format, which is abbreviated as PDF, or may be a bitmap file if it is a bitmap image. The attached information of the original image IM1 includes a print number TN representing how many images IM0 are to be printed, the sizes Bx and By of the original image IM1, and the like.

After acquiring the original image IM1, the control section 10 acquires the print number TN of images IM0 and the sizes Bx, By of the original image IM1 from the attached information, and calculates the maximum number NO of original images IM1 that can be arranged in the printable range AR0 shown in FIGS. 2, 3A, and the like (S104). The maximum number NO of original images IM1 can be calculated by setting the reduction ratio S to 100% and replacing the maximum number Ns with the maximum number NO in the equations (3) to (5). For example, it will be assumed that Ax=100 cm, Ay=30 cm, Bx=10.2 cm, By=7.5 cm, and M=0.25 cm. In this case, the transport direction maximum number Xn of original images IM1 is nine, the width direction maximum number Yn of the original images IM1 is three, and the maximum number NO of original images IM1 is 27.

Next, the control section 10 displays the imposition setting screen 510 illustrated in FIG. 7 on the display device 16 (S106). The imposition setting screen 510 shown in FIG. 7 has a display region of the print number TN of the image IM0, a display region of the sizes Bx and By of the original image IM1, a display region of the maximum number NO of the original image IM1, a reduction allowance/rejection selection region 511 of the original image IM1, a limit reduction ratio setting check box 512, a limit reduction ratio input field 513, an OK button 514, and the like. In FIG. 7, the print number TN is 1000, the horizontal size Bx is 10.2 cm, and the vertical size is 7.5 cm. The input device 15 may receive an operation of inputting the print number TN of the image IM0. In the reduction allowance/rejection selection region 511, "yes" is a selection item for permitting the reduction of the original image IM1, and "no" is a selection item for not permitting the reduction of the original image IM1. The input device 15 receives, in the reduction allowance/rejection selection region 511, an operation for selecting whether or not the reduction of the original image IM1 is permitted. The input device 15 receives, in the limit reduction ratio setting check box 512, an operation of selecting whether or not to set the limit reduction ratio Ts indicating the lower limit of the plurality of reduction ratios S for changing the size of the image IM0. The limit reduction ratio Ts is an example of a threshold value indicating a lower limit of a plurality of reduction ratios S for changing the size of the image IM0. As shown in FIG. 7, when the limit reduction ratio setting check box 512 is checked, the input device 15 receives an operation of inputting the limit reduction ratio Ts in the limit reduction ratio input field 513. When the input device 15 receives the operation of the OK button 514, the control section 10 holds the settings input to the aforementioned elements (511 to 513) in at least one of the RAM 13 and the storage device 14. FIG. 7 shows that the reduction of the original image IM1 is permitted, and the limit reduction ratio Ts is set to 77%.

After the imposition setting screen 510 is displayed, the control section 10 branches the process according to whether or not the reduction of the original image IM1 is permitted (S108). If reduction of the original image IM1 is not permitted, the control section 10 sets the reduction ratio S to 100% and advances the process to S116.

When reduction of the original image IM1 is permitted, the control section 10 calculates the maximum number Ns=Xn×Yn of images IM0 that can be arranged in the printable range AR0 including the gaps M, when the size of the image IM0 is changed according to each of the plurality of reduction ratios S (S110). The maximum number Ns=Xn×Yn can be calculated according to the equations (3) to (5) described above. When the limit reduction ratio Ts is set, the control section 10 may calculate the maximum number Ns=Xn×Yn from the reduction ratio 100% to the limit reduction ratio Ts at predetermined increments, for example, in increments of 1%.

When the display amount of the list L0 is to be reduced as shown in FIG. 4B, then with respect to the horizontal direction, the control section 10 may set the transport direction maximum number of the original image IM1 as the initial value, and set the transport direction maximum number Xn as the initial value, the initial value+1, the initial value+2, and . . . . The reduction ratio S corresponding to the transport direction maximum number Xn can be calculated according to equation (8) described above. With respect to the vertical direction, the control section 10 may set the width direction maximum number Yn of the original image IM1 to the initial value, the initial value+1, the initial value+2, and . . . . The reduction ratio S corresponding to the width direction maximum number Yn can be calculated according to equation (9) described above. When the display amount of the list L0 is to be reduced as shown in FIG. 4C, with the width direction maximum number of the original image IM1 as the initial value with respect to the vertical direction, the control section 10 may set the width direction maximum number Yn as the initial value, the initial value+1, the initial value+2, . . . . . The reduction ratio S corresponding to the width direction maximum number Yn can be calculated according to equation (9) described above. In either case, the maximum number Ns=Xn×Yn can be calculated according to the equations (3) to (5) described above.

After the maximum number Ns=Xn×Yn is calculated, the control section 10 displays the list L0 of combinations of reduction ratio S of the image IM0 and maximum number of images IM0 on the display device 16 as shown in FIGS. 4A to 4C (S112). Therefore, the control section 10 displays, as the list L0, the plurality of reduction ratios S and the maximum number Ns of images IM0 corresponding to the plurality of reduction ratios S. Here, as shown in FIG. 4A, the control section 10 may display, as the list L0, the width direction maximum number Yn, the transport direction maximum number Xn, and the maximum number Ns corresponding to each reduction ratio S as the reduction ratio S decreases by a predetermined increment from the reduction ratio 100%. The lower limit of the reduction ratio S may be the limit reduction ratio Ts. As shown in FIG. 4B, when among the reduction ratios of the plurality of levels, there are two or more reduction ratios at which the maximum number Ns is the same, the control section 10 may display, in the list L0, the reduction ratio S closest to 100% among the two or more reduction ratios. In this case, the control section 10 may display, as the list L0, the width direction maximum number Yn, the transport direction maximum number Xn, and the maximum number Ns corresponding to each reduction ratio S. The control section 10 may highlight a section where the increase ratio of the maximum number Ns resulting from a decrease in the reduction ratio S increases by a predetermined ratio or more, for example, by 0.2 or more. As shown in FIG. 4C, when among the reduction ratios in the plurality of levels, there are two or more reduction ratios at which the width direction maximum number Yn is the same, the control section 10 may display one selected from the two or more reduction ratios in the list L0. In this case, the control section 10 may display, as the list L0, the width direction maximum number Yn and the maximum number Ns corresponding to each reduction ratio S.

After the list L0 is displayed, the control section 10 receives an operation of selecting from the list L0 in the input device 15 in order to determine the reduction ratio S of the image IM0 (S114). When the input device 15 is attached to the surface of the display device 16, the input device 15 may receive a contact operation for selecting one of the plurality of reduction ratios S included in the list L0 and the maximum numbers Ns corresponding to the plurality of reduction ratios S on the display of the list L0. When a contact operation is performed on one of the plurality of reduction ratios S included in the list L0, the control section 10 selects the reduction ratio S on which the contact operation was performed. When the contact operation is performed on one of the plurality of maximum numbers Ns included in the list L0, the control section 10 selects the reduction ratio S corresponding to the maximum number Ns on which the contact operation was performed. The control section 10 may highlight the selected combination from among the combination of the reduction ratio S and the maximum number on the display device 16 as shown in FIGS. 4A to 4C. In FIGS. 4A to 4C, the combination with a reduction ration of 97% is shown selected by being surrounded by bold line.

Note that the selection operation of the reduction ratio S may be received without receiving the selection operation of the maximum number Ns, or the selection operation of the maximum number Ns may be received without receiving the selection operation of the reduction ratio S.

When the list L0 shown in FIG. 4A is displayed, the user can grasp the maximum number Ns=Xn×Yn corresponding to each of the many reduction ratios S. Therefore, the user can grasp the state of the margin of the medium ME0 on which the image IM0 is printed, in two directions, and can select the reduction ratio S from many options.

When the list L0 shown in FIG. 4B is displayed, the user can select a reduction ratio from the reduction ratios S at which the margin becomes as small as possible corresponding to the maximum number Ns=Xn×Yn. Therefore, the surface area of the list L0 is reduced so that the list L0 can be easily viewed, the margin is effectively utilized as much as possible, and the user can easily make a decision.

When the list L0 shown in FIG. 4C is displayed, the user can select from the reduction ratios S, a reduction ratio at which the margin becomes as small as possible in correspondence with the width direction maximum number Yn.

Therefore, the surface area of the list L0 is reduced so that the list L0 can be easily viewed, the margin is effectively utilized as much as possible, and the user can easily make a decision.

Figure 8:
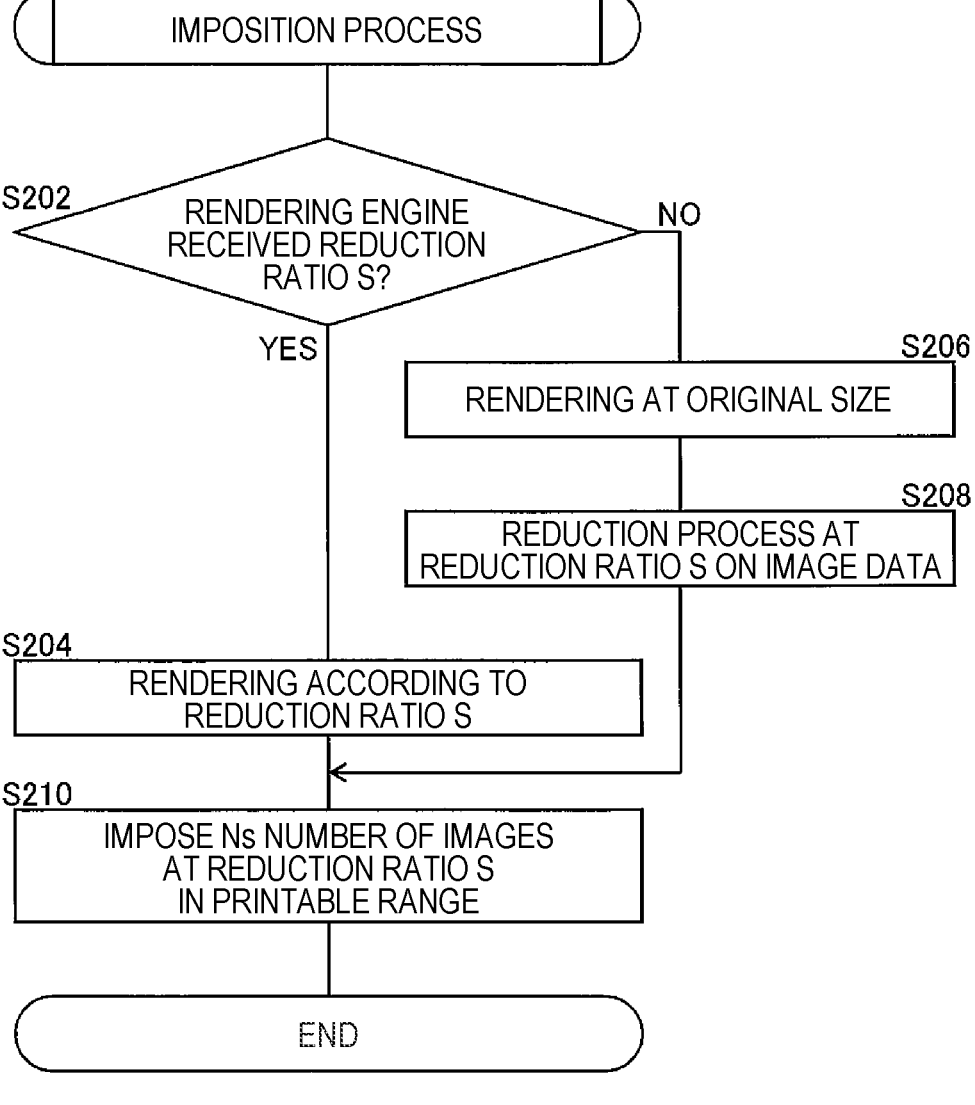
FIG. 8 is a flowchart schematically showing an example of an imposition process.

After selecting the reduction ratio S, the control section 10 imposes the maximum number Ns of images IM0 on the printable range AR0 in accordance with the selected reduction ratio S (S116). FIG. 8 schematically illustrates the imposition process performed in step S116. Although not shown, when the reduction ratio S is 100%, the control section 10 performs the process of S210 without performing the processes of S202 to S208.

When the imposition process starts, the control section 10 branches the process according to whether or not the rendering engine realized by the rendering program received the reduction ratio S and can execute rendering (S202). Although not shown, if the original image IM1 is a bitmap image, the control section 10 advances the process to S208.

When the rendering engine receives a reduction ratio S, the control section 10 performs a rendering process for converting the original image IM1, which is a vector image, into a bitmap image according to the selected reduction ratio S (S204). Thereafter, the control section 10 advances the process to S210.

When the rendering engine does not receive the reduction ratio S, the control section 10 performs a rendering process of converting the original image IM1, which is a vector image with the original dimensions, into a bitmap image (S206). Next, the control section 10 performs a reduction process of reducing the bitmap image as the original image IM1 by the reduction ratio S (S208), and advances the process to S210. The reduction process may be a process for performing interpolation calculation by a bicubic method, a process for performing interpolation calculation by a bilinear method, or the like. In the reduction of a bitmap image, an error is easily generated because it is necessary to calculate slight changes in data in units of single pixels, and a pixel which leads to blurring in the converted image IM2 may be generated. Therefore, it is desirable to generate the bitmap image of the reduction ratio S from the vector image in the rendering engine if possible.

After the processes of S202 through S208, the control section 10 imposes the image IM0 having the reduction ratio S of the maximum number Ns=Xn×Yn to the printable range AR0 (S210), and terminates the imposition process. Therefore, the control section 10 arranges the images IM0 whose size was changed according to the reduction ratio S corresponding to the operation on the display of the list L0, in the predetermined printable range AR0 in the maximum number Ns corresponding to the operation.

After the imposition process, the control section 10 starts a process of forming, on the print surface ME0a of the medium ME0, a plurality of images IM0 arranged in the printable range AR0 (S118). The printing section U6 prints the image IM0 corresponding to, among the plurality of reduction ratios S, the reduction ratio corresponding to the operation, in the printable range AR0 in the maximum number Ns that corresponds to the operation. Finally, the control section 10 transmits the imposition information IN1 indicating the arrangement of each image IM0 in the printable range AR0 to the post-processing apparatus PPO (S120), and terminates the print control process. Printing is performed until the print number TN of images IM0 are formed on the print surface ME0a of the medium ME0. The post-processing apparatus PPO performs, based on the received imposition information IN1, post-processing on the printed matter in which the plurality of images IM0 are arranged in the printable range AR0.

As described above, the printing device 1 can make it easy to select whether or not to increase the number of images IM0 in the printable range AR0 by changing the size of the image IM0 and effectively using the margin.

(4) MODIFICATIONS

Various variations of the present disclosure are conceivable.

For example, the printing device 1 may perform printing on a medium on which post-processing is not performed. In this case, the post-processing apparatus PPO may not be connected to the printing device 1. The printing device 1 may perform printing on a cut medium such as a cut sheet instead of a continuous medium. Therefore, the printable range AR0 may be a range of one sheet of the cut medium.

The original image IM1 to be processed is not limited to one type, but may be two or more types. When there are two or more types of original image IM1, the two or more types of original image IM1 may include original images having different sizes. Also in this case, the printing device 1 can calculate the maximum number Ns of the image IM0 that can be arranged in the printable range AR0 when the size of the image IM0 is changed according to each of the plurality of reduction ratios S, and display the list L0.

In the printable range AR0, additional information other than the image IM0, such as information indicating the size of the image IM0 or the reduction ratio S, may be arranged. In this case, the printing device 1 may calculate the maximum number Ns of the images IM0 that can be arranged in the printable range AR0 excluding the range of the additional information, or may display the list L0 including the obtained maximum number Ns.

In the above example, the conversion scales for changing the size of the image IM0 are reduction ratios, but the conversion scales may include magnification ratios larger than a conversion scale of one. Even when the conversion scales include magnification ratios, an effect of making it easy to select the number of images in the printable range to effectively use the margin can be obtained by enlarging the image.

The above-described process can be changed as appropriate, such as by changing the order. A part of the above process may be performed by the external device EX0. In this case, the combination of the control section 10 and the external device EX0 is an example of the printing device 1.

While displaying the list L0 as shown in FIGS. 4A to 4C, the printing device 1 may select, from among the reduction ratios S equal to or larger than the limit reduction ratio Ts, the reduction ratio closest to 100% with the largest maximum number Ns, and print the image IM0 with the reduction ratio within the printable range with the largest maximum number Ns.

The printing device 1 may highlight the combination including the reduction ratio closest to 100% with the maximum number Ns that is the largest.

FIGS. 9A to 9C show an example in which in S112 of FIG. 6, the control section 10 highlights, from among the reduction ratios S equal to or larger than the limit reduction ratio Ts, the reduction ratio closest to 100% that has the largest maximum number Ns.

In the list L0 shown in FIG. 9A, when the limit reduction ratio Ts is set to 80%, among the reduction ratios S in increments of 1% from the reduction ratio 100% to the reduction ratio 80%, the combination that has the maximum number Ns that is the largest and that includes the reduction ratio 86%, which is the closest to 100%, is surrounded by a bold line. When the reduction ratio S is the limit reduction ratio Ts, the control section 10 can calculate the transport direction maximum number Xn according to the above-described equation (3), the width direction maximum number Yn according to the above-described equation (4), and the transport direction maximum number Ns according to the above-described equation (5). Next, with respect to the horizontal direction, the control section 10 can calculate the maximum reduction ratio S (referred to as Sx) in which the transport direction maximum number Xn is the largest according to the above-described equation (8) and, with respect to the vertical direction, the control section 10 can calculate the maximum reduction ratio S (referred to as Sy) in which the width direction maximum number Yn is largest according to the above-described equation (9). Finally, the control section 10 highlights the combination including the smaller reduction ratio of the reduction ratio Sx and the reduction ratio Sy. In this manner, the control section 10 displays a recommendation for the reduction ratio that, among the plurality of reduction ratios S equal to or greater than the limit reduction ratio Ts, is closest to a reduction ratio of one and that has the largest maximum number Ns.

In the list L0 shown in FIG. 9B, among the reduction ratios S in increments of 1% from the reduction ratio 100% to the limit reduction ratio Ts=80%, when there are two or more reduction ratios at which the maximum number Ns is the same, the reduction ratio closest to a reduction ratio of one is shown among the two or more reduction ratios. In this case, the smallest reduction ratio among the reduction ratios S included in the list L0 corresponds to the largest number Ns and is the reduction ratio 86%, which is the closest to 100%. Therefore, when the list L0 shown in FIG. 9B is displayed, the control section 10 can perform display that recommends the reduction ratio that has the largest maximum number Ns and that is closest to a reduction ratio of one.

The list L0 shown in FIG. 9C shows, among the reduction ratios S of 1% increments from the reduction ratio 100% to the limit reduction ratio Ts=80%, the reduction ratio that is closest to a reduction ratio of one when there are two or more reduction ratios at which the width direction maximum number Yn is the same. In this case, the smallest reduction ratio among the reduction ratios S included in the list L0 corresponds to the largest number Ns and is the reduction ratio 97%, which is the closest to 100%. Therefore, when the list L0 shown in FIG. 9C is displayed, the control section 10 can recommend the reduction ratio that has the largest maximum number Ns and that is closest to a reduction ratio of one.

Of course, while displaying the list L0 as shown in FIGS. 9A to 9C, the control section 10 may select, from among the reduction ratios S equal to or larger than the limit reduction ratio Ts, the reduction ratio that is closest to 100% and that has the largest maximum number Ns, and print the images IM0 at that reduction ratio in the largest maximum number Ns in the printable range.

(5) CONCLUSION

As described above, according to various aspects of the present disclosure, it is possible to provide a technology and the like capable of making it easy to select the number of images in the printable range to effectively use the margin by changing the size of the image. As a matter of course, the above-described basic operations and effects can be obtained even with a technology consisting only of the constituent elements according to the independent claims.

A configuration in which the respective configurations disclosed in the above-described examples are replaced with each other or combinations thereof are changed, a configuration in which the respective configurations disclosed in the well-known art and the above-described examples are replaced with each other or combinations thereof are changed, and the like can also be implemented. The present disclosure also includes these configurations.

What is claimed is:

1. A printing device configured to perform printing by arranging a plurality of an image in a predetermined printable range, the printing device comprising:
   a processor configured to
      calculate a maximum number of the image arrangeable in the printable range when the size of the image is changed in accordance with each of a plurality of conversion scales for changing the size of the image, and
      display, as a list, the plurality of conversion scales and the maximum number corresponding to each of the plurality of conversion scales; and
   a roller for transporting, in a transport direction, a medium that is longer in the transport direction than in a width direction, which intersects the transport direction, wherein
   the printable range is included on a surface of the medium and is longer in the transport direction than in the width direction,
   the processor calculates a width direction maximum number, which is the maximum number of the image arrangeable in the printable range in the width direction when the size of the image is changed according to each of the plurality of conversion scales, and
   the processor displays, in the list, the width direction maximum number corresponding to each of the plurality of conversion scales.

2. The printing device according to claim 1, wherein when, among plural levels of conversion scales including the plurality of conversion scales, there are two or more conversion scales having the same maximum number, the processor displays, in the list, one selected from the two or more conversion scales.

3. The printing device according to claim 1, wherein when, among the plural levels of conversion scales, there are two or more conversion scales at which the maximum number is the same, the processor displays, in the list, the conversion scale of the two or more conversion scales that is closest to a conversion scale of one.

4. The printing device of claim 1, wherein the processor receives setting of a threshold indicating a lower limit of the plurality of conversion scales for changing size of the image, and the processor displays a recommendation of a conversion scale that, among the plurality of conversion scales equal to or larger than the threshold value, is the largest number and is closest to a conversion scale of one.

5. A printing device configured to perform printing by arranging a plurality of an image in a predetermined printable range, the printing device comprising:
   a processor configured to
      calculate a maximum number of the image arrangeable in the printable range when the size of the image is changed in accordance with each of a plurality of conversion scales for changing the size of the image, and display, as a list, the plurality of conversion scales and the maximum number corresponding to each of the plurality of conversion scales, wherein the processor calculates, when the size of the image is changed in accordance with each of the plurality of conversion scales, a first direction maximum number, which is a maximum number of the image arrangeable in the printable range in a first direction, which is along the printable range, and a second direction maximum number, which is a maximum number of the image arrangeable in the printable range in a second direction intersecting the first direction, which is along the printable range, and the processor displays, in the list, the first direction maximum number and the second direction maximum number corresponding to each of the plurality of conversion scales.

6. The printing device of claim 1, wherein the processor receives an operation of selecting, with respect to the display of the list, one from at least one of either the plurality of conversion scales included in the list or the maximum numbers corresponding to the plurality of conversion scales, and the printing device further comprises a print head configured to print, in the printable range and in the maximum number corresponding to the operation, the image in a size changed according to a conversion scale corresponding to the operation among the plurality of conversion scales.

7. The printing device of claim 1, wherein the images to be disposed in the printable range in the maximum number are the same size.

8. The printing device according to claim 1, further comprising:

a print head configured to print the maximum number of the image in the printable range with a gap between images, wherein the processor calculates the maximum number of the image, including the gap, arrangeable in the printable range when the size of the image is changed according to each of the conversion scales, and the gap is constant even if the size of the image is changed.

9. The printing device of claim 1, wherein the processor is connected to a post-processing apparatus configured to perform post-processing on a plurality of printed matter of the image arranged in the printable range and that is configured to transmit, to the post-processing apparatus, imposition information indicating arrangement of the images in the printable range.

10. A non-transitory computer-readable storage medium storing a display program, the display program being for a printing device that performs printing by arranging a plurality of an image in a predetermined printable range, the display program causing a computer to realize:

a calculation function of calculating a maximum number of the image arrangeable in the printable range when the size of the image is changed in accordance with each of a plurality of conversion scales for changing the size of the image; and a list display function of displaying, as a list, the plurality of conversion scales and the maximum number corresponding to each of the plurality of conversion scales, wherein when the size of the image is changed in accordance with each of the plurality of conversion scales, a first direction maximum number and a second direction maximum number are calculated, the first direction maximum number is a maximum number of the image arrangeable in the printable range in a first direction, which is along the printable range, the second direction maximum number is a maximum number of the image arrangeable in the printable range in a second direction intersecting the first direction, which is along the printable range, and the first direction maximum number and the second direction maximum number corresponding to each of the plurality of conversion scales are displayed in the list.

11. The printing device according to claim 5, wherein when, among plural levels of conversion scales including the plurality of conversion scales, there are two or more conversion scales having the same maximum number, the processor displays, in the list, one selected from the two or more conversion scales.

12. The printing device according to claim 5, wherein when, among the plural levels of conversion scales, there are two or more conversion scales at which the maximum number is the same, the processor displays, in the list, the conversion scale of the two or more conversion scales that is closest to a conversion scale of one.

13. The printing device of claim 5, wherein the processor receives setting of a threshold indicating a lower limit of the plurality of conversion scales for changing size of the image, and the processor displays a recommendation of a conversion scale that, among the plurality of conversion scales equal to or larger than the threshold value, is the largest number and is closest to a conversion scale of one.

14. The printing device of claim 5, wherein the processor receives an operation of selecting, with respect to the display of the list, one from at least one of either the plurality of conversion scales included in the list or the maximum numbers corresponding to the plurality of conversion scales, and the printing device further comprises a print head configured to print, in the printable range and in the maximum number corresponding to the operation, the image in a size changed according to a conversion scale corresponding to the operation among the plurality of conversion scales.

15. The printing device of claim 5, wherein the images to be disposed in the printable range in the maximum number are the same size.

16. The printing device according to claim 5, further comprising:

a print head configured to print the maximum number of the image in the printable range with a gap between images, wherein the processor calculates the maximum number of the image, including the gap, arrangeable in the printable range when the size of the image is changed according to each of the conversion scales, and the gap is constant even if the size of the image is changed.

17. The printing device of claim 5, wherein the processor is connected to a post-processing apparatus configured to perform post-processing on a plurality of printed matter of the image arranged in the printable range and that is configured to transmit, to the post-processing apparatus, imposition information indicating arrangement of the images in the printable range.

* * * * *